United States Patent
Sabin et al.

(10) Patent No.: US 8,561,137 B2
(45) Date of Patent: Oct. 15, 2013

(54) TECHNIQUES FOR IDENTITY AUTHENTICATION OF VIRTUALIZED MACHINES

(75) Inventors: Jason Allen Sabin, Lehi, UT (US); Jeremy Ray Brown, Orem, UT (US); Lloyd Leon Burch, Payson, UT (US)

(73) Assignee: Oracle International Corporation, Redwood Shores, CA (US)

( * ) Notice: Subject to any disclaimer, the term of this patent is extended or adjusted under 35 U.S.C. 154(b) by 1140 days.

(21) Appl. No.: 12/177,932

(22) Filed: Jul. 23, 2008

(65) Prior Publication Data

US 2010/0023996 A1  Jan. 28, 2010

(51) Int. Cl.
*H04L 9/32* (2006.01)
*G06F 9/455* (2006.01)

(52) U.S. Cl.
USPC .................................................. 726/2; 718/1

(58) Field of Classification Search
USPC .............................. 726/1–4, 16, 26
See application file for complete search history.

(56) References Cited

U.S. PATENT DOCUMENTS

| | | | |
|---|---|---|---|
| 5,029,077 A * | 7/1991 | Fatahalian et al. ............ | 345/418 |
| 5,887,131 A * | 3/1999 | Angelo ............................ | 726/20 |
| 6,853,988 B1 * | 2/2005 | Dickinson et al. .............. | 705/75 |
| 7,334,136 B2 | 2/2008 | Levy et al. | |
| 7,865,893 B1 * | 1/2011 | Omelyanchuk et al. .......... | 718/1 |
| 2002/0065872 A1 * | 5/2002 | Genske et al. ................. | 709/202 |
| 2002/0118644 A1 * | 8/2002 | Moir ........................... | 370/230.1 |
| 2002/0129135 A1 * | 9/2002 | Delany et al. ................. | 709/223 |
| 2005/0091658 A1 * | 4/2005 | Kavalam et al. .............. | 718/104 |
| 2005/0138370 A1 * | 6/2005 | Goud et al. .................... | 713/164 |
| 2005/0216795 A1 * | 9/2005 | Dawkins et al. .............. | 714/100 |
| 2005/0283826 A1 * | 12/2005 | Tahan ............................... | 726/2 |
| 2006/0041645 A1 * | 2/2006 | Zhang et al. ................... | 709/220 |
| 2006/0059545 A1 * | 3/2006 | Stanforth .......................... | 726/4 |
| 2006/0074850 A1 * | 4/2006 | Bouchet .......................... | 707/1 |
| 2006/0146057 A1 * | 7/2006 | Blythe ......................... | 345/506 |
| 2006/0253706 A1 | 11/2006 | Roberts et al. | |
| 2008/0005798 A1 * | 1/2008 | Ross .............................. | 726/26 |
| 2008/0046581 A1 * | 2/2008 | Molina et al. ................. | 709/229 |
| 2008/0098392 A1 * | 4/2008 | Wipfel et al. ..................... | 718/1 |
| 2008/0098457 A1 | 4/2008 | Carter | |
| 2008/0098462 A1 | 4/2008 | Carter | |
| 2008/0155208 A1 | 6/2008 | Hiltgen et al. | |
| 2008/0163208 A1 * | 7/2008 | Burr et al. ......................... | 718/1 |
| 2008/0235406 A1 * | 9/2008 | Meijer et al. .................... | 710/16 |
| 2008/0256349 A1 * | 10/2008 | Dennis et al. .................... | 713/1 |
| 2008/0301770 A1 * | 12/2008 | Kinder ............................. | 726/2 |
| 2009/0104965 A1 * | 4/2009 | House et al. .................... | 463/20 |
| 2010/0138674 A1 * | 6/2010 | Dimitrakos et al. .......... | 713/194 |

OTHER PUBLICATIONS

Carter, S., "Virtualized Workflow Processing", U.S. Appl. No. 11/692,309, filed Mar. 28, 2007.
McClain, et al., "Federated Role Provisioning", U.S. Appl. No. 11/693,155, filed Mar. 29, 2007.

* cited by examiner

*Primary Examiner* — Saleh Najjar
*Assistant Examiner* — Shu Chun Gao
(74) *Attorney, Agent, or Firm* — Osha Liang LLP (57) ABSTRACT

Techniques for identity authentication of Virtual Machines (VM's) are provided. A VM is authenticated and once authenticated, each device interfaced to or accessible to the VM is also authenticated. When both the VM and each device are authenticated, the VM is granted access to a machine for installation thereon.

20 Claims, 3 Drawing Sheets

TECHNIQUES FOR IDENTITY AUTHENTICATION OF VIRTUALIZED MACHINES

BACKGROUND

Increasingly enterprises are attempting to utilize existing technology to conduct business and affairs in a remote and more automated manner. For example, enterprises are now capable of deploying software services to remote facilities or customers over the Internet.

Moreover, with the capabilities of current technology enterprises can deploy several logical machines, each with their own independent processing environments, to one machine architecture. This concept is referred to as virtualization achieved via virtual machines (VM's) that are superimposed on an underlying physical architecture of a single machine.

In fact, VM's are becoming more and more common in the industry. One problem with VM's is the manner in which the VM operating systems (OS's) interact with the physical hardware of the machine on which they are deployed. Each VM has access to the physical machine's hardware. This includes memory, processor(s), hard drive(s), network card(s), and/or any other device physically located on the physical machine having a VM layered thereon. So, each VM OS installed on a VM has access to the physical hardware via that VM OS's VM.

Potentially, a hacker could use the VM's to further his/her own malicious ends. The hacker community is just now starting to discuss and investigate how to hack into VM's. Suppose a hacker gained access to a VM OS, the OS controls the ability to create new VM OS's. So, a hacker could create and spawn an additional OS that just the hacker was aware of. Once that is done, the hacker could use the OS to gain access to the underlying physical hardware of the VM, which includes memory, processor(s), hard drive(s), network card(s), etc. Additionally, the hacker could use the machine to attack other machines on the network and potentially have root access that would let the VM run undetected on the physical hardware with potentially scary consequences for the enterprise.

Thus, what is needed is a mechanism for improved VM authentication.

SUMMARY

In various embodiments, techniques for identity authentication of Virtual Machines (VM's) are provided. More specifically, and in an embodiment, a method is provided for authenticating a VM. A request is received by the VM to install on a machine. The machine is interrogated for identity information unique to the machine. Next, an attempt is made to authenticate the VM and the identity information before authorizing the request and permitting the VM to install on the machine.

DETAILED DESCRIPTION

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity services may authenticate and establish trust with one another, viewing one another as a specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "VM" is a software implementation of a physical machine that acts as its own independent logical machine with its own independent processing environment and OS's layered thereon. Moreover, the phrase "physical machine" may be used synonymously herein with the term "machine," unless machine is prefixed with the term "virtual" in which case the machine is a VM, as defined above. To an end user or automated applications, a VM looks, feels, and appears to be a physical machine.

Also, it is noted that a VM includes an emulator and/or a simulator. That is, an emulator that duplicates a system is a VM for purposes of the embodiments discussed herein and below. Additionally, a simulator that models a system or portion of a system is also a VM for purposes of the embodiments discussed herein and below. In this sense, the terms "emulator," "simulator," and "VM" may all be used synonymously and interchangeably with one another.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
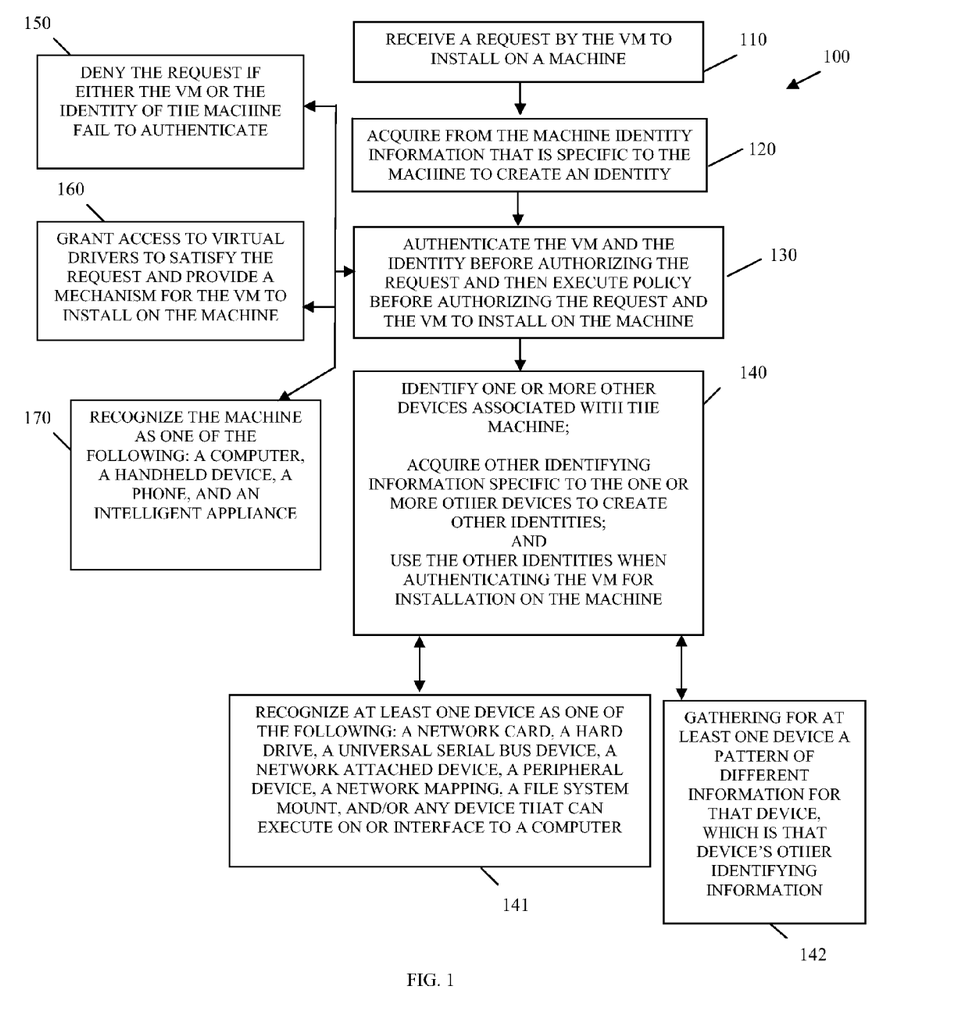
FIG. 1 is a diagram of a method for authenticating a Virtual Machine (VM), according to an example embodiment.

FIG. 1 is a diagram of a method 100 for authenticating a Virtual Machine (VM), according to an example embodiment. The method 100 (hereinafter "VM server service") is implemented as instructions in a machine-accessible and readable medium. The instructions when executed by a machine perform the processing depicted in FIG. 1. The VM server service is also operational over and processes within a network. The network may be wired, wireless, or a combination of wired and wireless.

As will be more fully described herein and below, the VM server service permits a VM to be authenticated in a manner that accounts for each piece of physical hardware associated with the VM. The VM is not permitted to install on a machine (computer, handheld device, phone, etc.) when the VM and the underlying hardware devices accessible to the VM are not identified and authenticated properly.

In an embodiment, a VM server is setup or configured as a shim between a VM's OS and the underlying physical hardware of the machine that is to potentially install and run the VM's OS.

The VM server includes a new module that acts a novel authentication service. This authentication service may be viewed as the VM server service. The VM server service works with the identity of each VM. Moreover, the VM server service performs all authentication, verifies credentials, and provides an identity, perhaps via a third-party identity service, for all VM OS's either local or remote for the VM server or a cluster of VM servers.

So, initially when a VM server is setup there is a configuration technique that permits the VM server service, perhaps in cooperation with an identity service, to validate the identity of the VM OS. For example, X.509 authentication may be used as a mechanism from authenticating the identity of the VM. Certificates can also be generated from the VM OS and each VM. Each VM OS that is brought up within the VM server will also have a set of credentials that are sent to the VM server to allow access to the underlying hardware resource based upon identity. The VM server service provides the ability to verify all the credentials to protect the hardware resources.

Thus, before the VM server allows the VM or VM OS access to any physical hardware of the machine on which the VM and VM OS are being installed, the VM server uses the VM server service to perform authentication and verify credentials. Again, these credentials can be any form, such as X.509, name/password pair, assertions, or any number of other authentication possibilities. The VM server service assures that if the credentials are valid, the identity is consumed and access is granted to the VM or VM OS to install on the machine and gain access to the physical hardware resources.

In an embodiment, the VM server does not actually grant direct access to the physical hardware; rather, the VM server gives the VM or VM OS access to VM drivers. The VM server has generic shim drivers that are present to the VM OS and that provides a security mechanism based upon identity authentication.

Should the VM or VM OS provide invalid credentials, resulting in an identity that is not trusted, then access is denied for using the physical hardware. Thus, if a rogue malicious VM or VM OS is spawned by a hacker, he/she is unable to exploit the physical hardware and unable to establish a hacked VM or VM OS.

Should the VM or VM OS provide valid credentials for the identity, then the VM or VM OS is allowed access to the VM drivers for using the machine and the corresponding physical hardware.

So, the VM server uses the VM server service to authenticate the VM or VM OS and the underlying machine and hardware. The VM server service can be remote or can enlist the services of remote authentication or identity services. Alternatively, the VM server service can be local to the VM server service. If the VM server service is remote the VM server establishes a trust relationship with the VM server service so it can trust that the actions of the VM server service are legitimate and can be relied upon.

The processing of the VM server service is now discussed in greater detail with reference to the FIG. 1.

At 110, the VM server service receives a request from a VM to install on a machine. The request is received from the VM server or the shim mechanism that permits a VM or VM OS to install on the machine or physical hardware. The VM needs drivers to install and the VM server or shim mechanism has the drivers so, any process requesting to install the VM or VM OS needs access to the drivers. So, the VM server of shim mechanism knows when this occurs and can send the request to the VM server service.

At 120, the VM server service acquires from the machine and its underlying physical or logical devices for identity information that is specific of unique (highly unlikely to not be associated with the machine) to the machine and the underlying physical and logical devices. Each of the devices includes some identifiable pattern that the VM server service establishes via the interrogation. For example, a network card (physical device) can use a Media Access Control (MAC) address and the Address Resolution Protocol (ARP) to uniquely identify that network card from another network card. A hard drive (physical device) can be identified by the physical serial number embedded in the storage of the hard drive. A file mount point can identify a particular network drive, etc. As each of the devices of the machine are connected to the VM server or shim mechanism, the VM Monitor or virtualization hypervisor, needs to identify each of these hardware components and establish their identities. The virtualization hypervisor can be used to identify and verify all the identities of the physical hardware for the VM server service during the interrogation processing. So, each device of the machine and the machine itself are consulted to acquire the identity information via identifiable patterns. Once the hypervisor verifies the identity of the machine and the devices of the machine, the hypervisor consults VM server service. Also, an identity is created for the machine in response to the identifying information. Again, the VM server service can be local to the hypervisor and VM server or remote, as discussed above. In an embodiment, the VM server service is remote and the hypervisor communicates with the VM server service via a federation protocol including Liberty, Security Assertion markup Language (SAML), etc.

At 130, the VM server service authenticates the VM and the identity of the machine and executes policy before authorizing the request and permitting the VM or VM OS to install on the machine. The policy identifies based on the situation and the identity of the machine whether to permit the VM or VM OS to install on the machine.

According to an embodiment, at 140, the VM server service identifies one or more other devices associated with the machine. Next, the VM server service acquires other indentifying information specific or unique (highly unlikely to not be associated with the other machines) to the one or more other devices to create other identities. The VM server service then uses the other identifying information when attempting to authenticate the VM or VM OS for installation on the machine.

In some cases, at 141, the VM server service recognizes at least one device as one or more of the following: a network card, a hard drive, a universal serial bus (USB) device, a network attached device, a peripheral device, a network mapping, a file system mount, and/or any device that executes on or is interfaced to a computer, etc.

In another situation, at 142, the VM server service gathers, for at least one device, a pattern of different information for that device, which is that particular device's other indentifying information.

In an embodiment, at 150, the VM server service denies the request if either the VM/VM OS or the identity of the machine fails to properly authenticate or if the policy indicates that the request should not be permitted.

At 160, the VM server service grants access to VM drivers to satisfy the request and provide a mechanism for the VM/VM OS to install on the machine when authentication is successful.

According to an embodiment, at 170, the VM server service recognizes the machines as one of the following: a computer, a handheld device, a phone, a gaming device, and an intelligent appliance.

Figure 2:
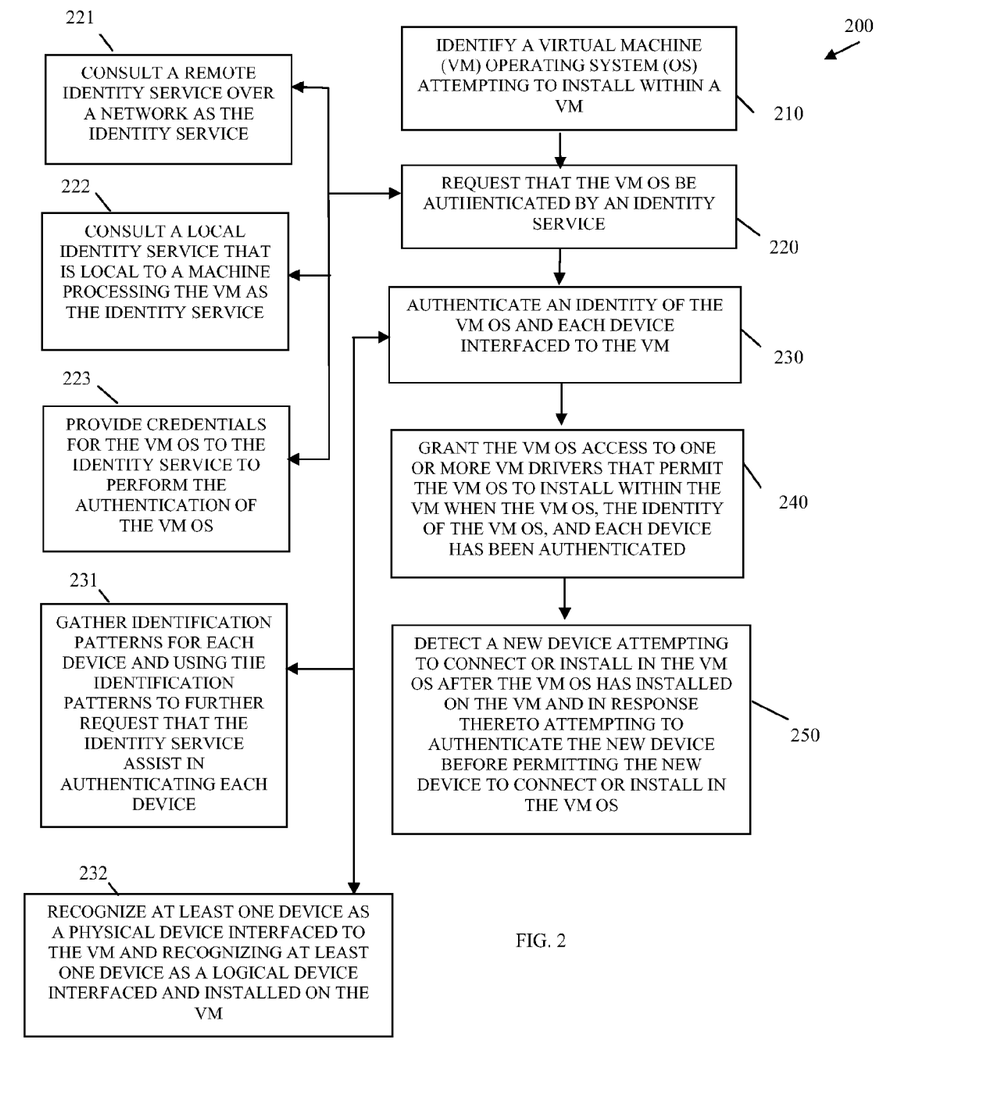
FIG. 2 is a diagram a method for authenticating a VM operating system (OS), according to an example embodiment.

FIG. 2 is a diagram a method 200 for authenticating a VM operating system (OS), according to an example embodiment. The method 200 (hereinafter "VM OS authentication service") is implemented as instructions in a machine-accessible and readable medium. The instructions when executed by a machine perform the processing depicted in FIG. 2. The VM OS authentication service is also operational over and processes within a network. The network may be wired, wireless, or a combination of wired and wireless.

Whereas the techniques presented above with respect to the method 100 of the FIG. 1 authenticate a VM of VM OS for installation, the techniques presented with the VM OS authentication service depict authentication of a VM OS for installation on a particular and already authenticated VM.

At 210, the VM OS authentication service identifies a VM OS attempting to install within a particular already authenticated VM.

At 220, the VM OS authentication service requests that the VM OS be authenticated by an identity service on behalf of the VM OS authentication service. This can be achieved via a variety of manners.

For instance, at 221, the VM OS authentication service consults a remote identity service over a network, such as the Internet. The remote identity service is the identity service discussed at 220.

In another case, at 222, the VM OS authentication service consults a local identity service that is local to a machine processing the VM. The local identity service is the identity service discussed at 220.

According to an embodiment, at 223, the VM OS authentication service provides credentials for the VM OS to the identity service so that the identity service can perform authentication of the VM OS on behalf of the VM OS authentication service.

At 230, the VM OS authentication service authenticates an identity of the VM OS and each device interfaced or accessible to the VM on which the VM OS is being installed. Again, this can be achieved via a variety of mechanisms.

For example, at 231, the VM OS authentication service gathers identification patterns, such as via the assistance of a hypervisor service. The VM OS authentication service then uses the identification patterns to further request that the identify service assist the VM OS authentication service in authenticating each device of the VM.

In an embodiment, at 232, the VM OS authentication service recognizes at least one device as a physical device interfaced to the VM and recognizes at least one device as a logical device interfaced and installed on the VM. A logical device may be another VM superimposed on the VM that the VM OS is being installed on or may be driver or device represented as software within the VM that the VM OS is being installed on.

At 240, the VM OS authentication service grants the VM access to one or more VM drivers that permit the VM OS to install with the VM when the VM OS, the identity of the VM OS, and each device and each device's identity are successfully authenticated via the identity service.

According to an embodiment, at 250, the VM OS authentication service detects when the VM OS is processing that a new device is attempting to connect or install in the VM OS.

This occurs after the VM OS successfully installed on the VM. In response to this situation, the VM OS authentication service attempts to authenticate the new device in the manners discussed above before permitting the VM OS to install or successfully connect the new device in the VM OS.

The advantage of the VM OS authentication service and the method 100 (discussed above with reference to the method 100 of the FIG. 1) is that not only is the physical hardware protected from malicious OS's but the OS's are protected from malicious hardware devices that may attempt to install or connect to those OS's. So, a rogue USB device interfaced to a VM OS is detectable. Additionally, an attempt by a hacker to add a rogue network drive to a VM OS is detectable. Essentially, the identity of hardware is verified via identifiable patterns before access is granted to VM's and VM OS's. This results in safer and more secure virtualized environments for VM's, VM OS's, and the physical hardware.

Figure 3:
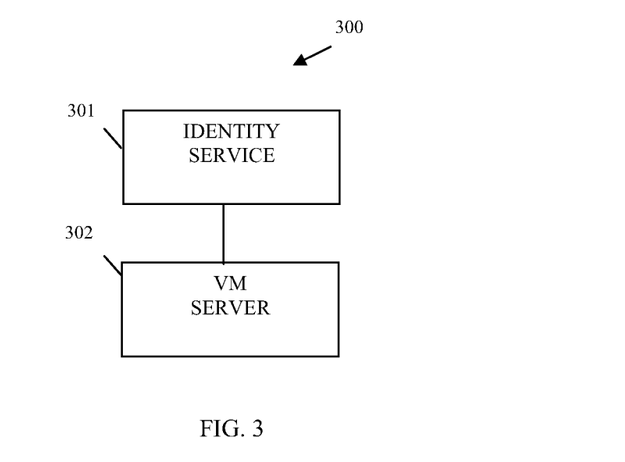
FIG. 3 is a diagram of a VM authentication system, according to an example embodiment.

FIG. 3 is a diagram of a VM authentication system 300, according to an example embodiment. The VM authentication system 300 is implemented as instructions (within a machine-accessible and computer-readable storage medium) that when executed by a machine perform, among other things, the processing discussed above with respect to the methods 100 and 200 of the FIGS. 1 and 2, respectively. Moreover, the VM authentication system 300 is operational over a network, and the network may be wired, wireless, or a combination of wired and wireless.

The VM authentication system 300 includes an identity service 301 and a VM server 302. Each of these components of the system 300 and their interactions with one another will now be discussed in detail.

The identity service 301 is implemented in a machine-accessible and computer readable storage medium and processes on a machine of the network. Example identity services that may be modified to achieve the teachings presented here were discussed and incorporated by reference herein and above.

According to an embodiment, the identity service 301 is remotely located over a network from the VM server 302.

In another case, the identity service 301 is local to the processing environment of the VM server 302.

The VM server 302 is implemented in a machine-accessible and computer-readable storage medium and processes on the same machine as the identity service 301 or an entirely different machine of the network. Example processing associated with the VM server 302 was presented in detail above with reference to the methods 100 and 200 of the FIGS. 1 and 2, respectively.

The VM server 302 identifies an attempt by the VM OS to install on a VM and consults the identity service 301 for purposes of authenticating the VM OS and each device interfaced to the VM. When the VM OS and each device are successfully authenticated by the identity service 301, the VM server 302 gives the VM OS access to VM drivers that permit the VM OS to install on the VM.

According to an embodiment, the VM server 302 provides one or more certificates to the VM OS once the VM OS is successfully authenticated. The VM OS uses the certificates for subsequent validation and authentication of the VM OS to other resources of the network.

In an embodiment, the VM server 302 identifies the attempt being made to install the VM OS when the VM makes a request directed to the VM server 302 to authenticate the VM OS for installation on behalf of the VM.

In some cases, each device is authenticated by dynamically acquiring identifying information associated with each device during the authentication attempt. The identifying information includes producing identifying patterns from the identifying information to uniquely identify each device for authentication.

Figure 4:
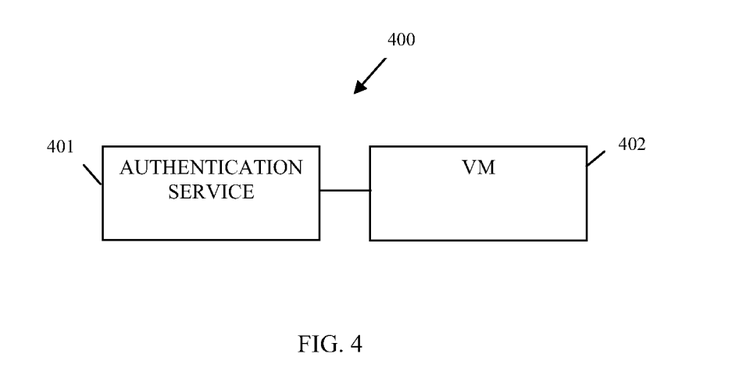
FIG. 4 is a diagram of another VM authentication system, according to an example embodiment.

FIG. 4 is a diagram of another VM authentication system 400, according to an example embodiment. The VM authentication system 400 is implemented as instructions on or within a machine-accessible and computer-readable storage medium. The instructions when executed by a machine perform processing depicted with respect to the methods 100 and 200 of the FIGS. 1-2, respectively. The VM authentication system 400 is also operational over a network and the network may be wired, wireless, or a combination of wired and wireless.

The VM authentication system 400 presents a different perspective and in some cases enhanced perspective of the VM authentication system 300 discussed above with reference to the FIG. 3.

The VM authentication system 400 includes an authentication service 401 and a VM 402. Each of these and their interactions with one another will now be discussed in detail.

The authentication service 401 is implemented in a machine-accessible and computer-readable storage medium and is to process on a machine of the network. In some cases, the authentication service 401 may be viewed as the identity service 301 discussed above with reference to the VM authentication system 300 of the FIG. 3.

The VM 402 is implemented in a machine-accessible and computer-readable storage medium and is to process on the same machine as the authentication service 401 or an entirely different machine of the network from that which is associated with the authentication service.

The VM 402 detects when a VM OS attempts to install within the VM 402. In response, the VM 402 consults the authentication service 401 for purposes of authenticating the VM OS and for purposes of supplying a unique VM OS identity.

The VM 402, such as via a hypervisor service, interrogates each device associated with the VM 402 for unique identifying information and then authenticates each device in response to that device's unique identifying information.

The VM 402 provides the VM OS access to VM drivers that permit the VM OS to install within the VM 402 when the VM OS is successfully authenticated and when each device is also successfully authenticated.

In an embodiment, at least one device is a logical device (software defined, such as another VM). Furthermore, at least one device is a physical device.

According to an embodiment, the VM 402 interacts with a VM server, such as VM server 302 of the FIG. 3. The VM server consults the authentication service 401 on behalf of the VM 402.

Also, in some cases, the VM 402 authenticates itself to the authentication service 401 before consulting the authentication service 401 and before requesting authentication of the VM OS and acquiring from the authentication service 401 the unique VM OS identity.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A non-transitory computer-readable medium comprising instructions for authenticating a virtual machine (VM) and a VM operating system (VMOS) that, when executed by a processor, perform a method, the method comprising:
   receiving, by a VM server service, a request to install the VM on a physical machine, wherein the physical machine comprises a plurality of physical devices;
   authenticating, by the VM server service, VM credentials of the VM in response to receiving the request;
   acquiring identity information for each of the plurality of physical devices using an identifiable pattern of each of the plurality of physical devices;
   authenticating, by the VM server service, the physical machine by verifying the identity information for each of the plurality of physical devices;
   determining that the VM is an authenticated VM in response to authenticating the VM credentials and authenticating the physical machine;
   providing drivers for the plurality of physical devices to the authenticated VM, wherein the authenticated VM is installed on the physical machine using the drivers;
   identifying, by a VMOS authentication service, the VMOS attempting to install on the authenticated VM;
   authenticating, by the VMOS authentication service, a VMOS identity of the VMOS;
   authenticating, by the VMOS authentication service, the physical machine by verifying the identity information for each of the plurality of physical devices;
   providing, by the VMOS authentication service, VM drivers to the VMOS in response to the authenticating the VMOS identity and the authenticating the identity information, wherein the VMOS is installed on the authenticated VM using the VM drivers.

2. The computer-readable medium of claim 1, the method further comprising:
   identifying new devices added to the physical machine;
   acquiring identifying information specific to the new devices using an identifiable pattern of the new devices; and
   using the identifying information specific to the new devices when authenticating the VM for installation on the physical machine.

3. The computer-readable medium of claim 2, wherein identifying new devices further includes recognizing at least one new device as one selected from a group consisting of a network card, a hard drive, a universal serial bus device, a network attached device, a peripheral device, and a network mapping, a file system mount.

4. The computer-readable medium of claim 1, wherein acquiring the identity information further comprises gathering information for each device which is unique to that device as compared to other devices on the physical machine.

5. The computer-readable medium of claim 1, the method further comprising, denying the request when the VM credentials fail to authenticate.

6. The computer-readable medium of claim 1, wherein providing drivers for the plurality of physical devices to the authenticated VM further comprises:
   granting the authenticated VM access to virtual drivers; and
   provide a mechanism for the authenticated VM to install on the physical machine.

7. The computer-readable medium of claim 1, wherein receiving the request further comprises recognizing the physical machine as one selected from a group consisting of a computer, a handheld device, a phone, and an intelligent appliance.

8. A method, comprising:
   receiving, by a virtual machine (VM) server service, a request to install a VM on a physical machine, wherein the physical machine comprises a plurality of physical devices;
   authenticating, by the VM server service, VM credentials of the VM in response to receiving the request;
   acquiring identity information for each of the plurality of physical devices using an identifiable pattern of each of the plurality of physical devices;
   authenticating, by the VM server service, the physical machine by verifying the identity information for each of the plurality of physical devices;
   determining that the VM is an authenticated VM in response to authenticating the VM credentials and authenticating the physical machine;
   providing drivers for the plurality of physical devices to the authenticated VM, wherein the authenticated VM installs on the physical machine using the drivers;
   identifying, by a VM operating system (VMOS) authentication service, a VMOS attempting to install on the authenticated VM;
   authenticating, by the VMOS authentication service, a VMOS identity of the VMOS;
   authenticating, by the VMOS authentication service, the physical machine by verifying the identity information for each of the plurality of physical devices; and
   providing, by the VMOS authentication service, VM drivers to the VMOS in response to the authenticating the VMOS identity and the authenticating the identity information, wherein the VMOS is installed on within the authenticated VM using the VM drivers.

9. The method of claim 8, wherein authenticating the VMOS identity further comprises consulting a remote identity service over a network as an identity service.

10. The method of claim 8, wherein authenticating the VMOS identity further comprises consulting a local identity service that is local to a machine processing the VM server service.

11. The method of claim 8, wherein authenticating the VMOS identity further comprises providing credentials for the VMOS to an identity service to perform the authentication of the VMOS identity.

12. The method of claim 8, wherein verifying the identity information for each of the plurality of physical devices comprises gathering identification patterns for each device and using the identification patterns to further request that an identity service assist in authenticating each device.

13. The method of claim 8, wherein verifying the identity information for each of the plurality of physical devices comprises recognizing at least one device as a physical device interfaced to the VM and recognizing at least one device as a logical device interfaced and installed on the VM.

14. The method of claim 8 further comprising:
detecting a new device attempting to install on the VMOS after the VMOS has installed on the VM; and
authenticating the new device before permitting the new device to connect or install in the VMOS.

15. A Virtual Machine (VM) server comprising:
a processor;
a plurality of physical devices;
a VM server service, executing on the processor configured to:
   receive a request to install a VM on the VM server;
   authenticate VM credentials of the VM in response to receiving the request;
   acquire identity information for each of the plurality of physical devices using an identifiable pattern of each of the plurality of physical devices;
   authenticate the plurality of physical devices by verifying the identity information for each of the plurality of physical devices;
   determine that the VM is an authenticated VM in response to authenticating the VM credentials and authenticating the plurality of physical devices; and
   provide drivers for the plurality of physical devices to the authenticated VM, wherein the authenticated VM installs on the VM server using the drivers;
a VM operating system (VMOS) authentication service configured to:
   identify a VMOS attempting to install on the authenticated VM;
   authenticate a VMOS identity of the VMOS;
   authenticate the plurality of physical devices by verifying the identity information for each of the plurality of physical devices;
   provide VM drivers to the VMOS in response to the authenticating the VMOS identity and the authenticating the identity information, wherein the VMOS uses the VM drivers to install on the authenticated VM.

16. The system of claim 15, wherein authenticating the VMOS identity comprises consulting an identity service remotely located over a network from the VM server.

17. The system of claim 15, wherein VM server provides one or more certificates to the VMOS once successfully authenticated for subsequent validation and authentication of the VMOS to other resources of a network.

18. The system of claim 15, wherein the VM server identifies the VM making a request to the VM server to authenticate the VMOS for installation.

19. The system of claim 15, wherein verifying the identity information for each of the plurality of physical devices comprises dynamically acquiring identity information associated with each device during the authentication.

20. The system of claim 19, wherein the identity information includes producing patterns from the identity information unique to each device.

* * * * *

UNITED STATES PATENT AND TRADEMARK OFFICE
CERTIFICATE OF CORRECTION

| | | |
|---|---|---|
| PATENT NO. | : 8,561,137 B2 | Page 1 of 1 |
| APPLICATION NO. | : 12/177932 | |
| DATED | : October 15, 2013 | |
| INVENTOR(S) | : Sabin et al. | |

It is certified that error appears in the above-identified patent and that said Letters Patent is hereby corrected as shown below:

In the Specification

Column 5, line 47-48, delete "indentifying" and insert -- identifying --, therefor.

Column 5, line 62-63, delete "indentifying" and insert -- identifying --, therefor.

Signed and Sealed this
Third Day of June, 2014

Michelle K. Lee
*Deputy Director of the United States Patent and Trademark Office*